United States Patent Office 3,544,142
Patented Dec. 1, 1970

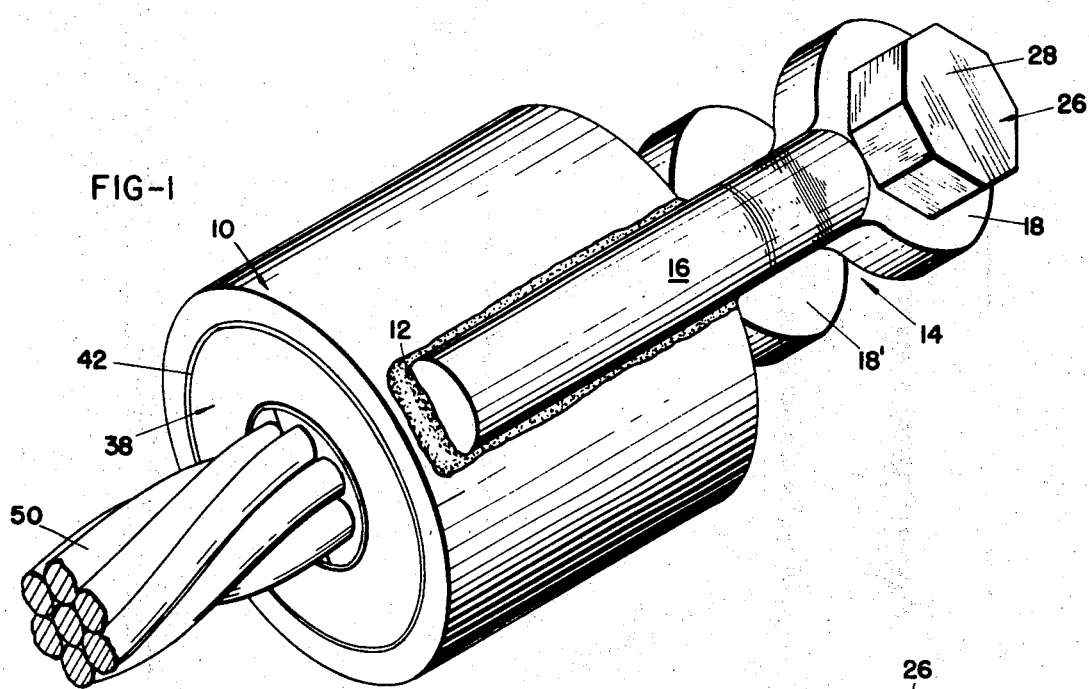
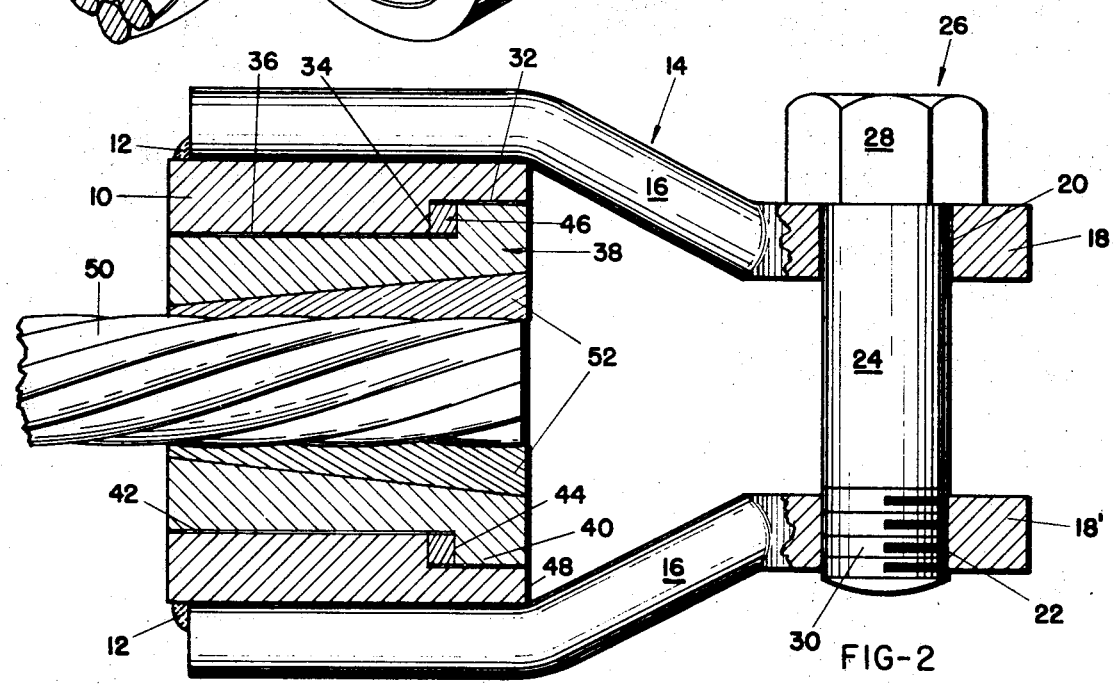
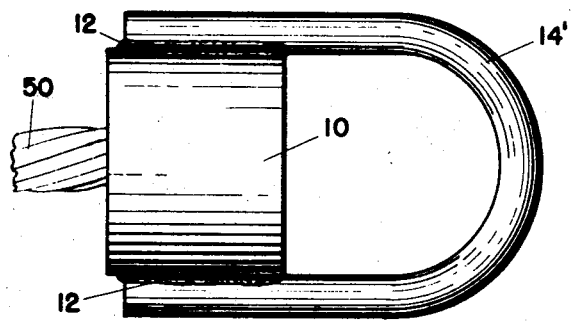

3,544,142
SWIVEL HITCH FOR WIRE ROPE
Reuben R. Moss, Jr., Box 265, Superior, Mont. 59872
Filed May 14, 1968, Ser. No. 729,005
Int. Cl. F16c *11/00;* F16g *11/04*
U.S. Cl. 287—91                                             1 Claim

ABSTRACT OF THE DISCLOSURE

A clevis having a swivel between the wire rope supporting the clevis and a quick disconnect for the wire rope attachment. The device comprises a cylindrical-like body having a stepped interior bore forming a shoulder. A rotor having a shoulder portion is positioned in the bore with a thrust member between the shoulders to allow for rotation. The rotor has an internal conical surface receiving wedges for clamping a cable. Clevis arms are welded to the body which have inturned apertured discs for a clevis pin.

---

My present invention relates to heavy duty equipment, similar to that used in the logging industry and particularly to a swivel hitch for wire rope, designed to withstand many tons of pressure.

In the logging industry, after trees are "felled" and "limbed," it often is necessary to transport them in the woods to a point where they may be loaded onto a truck for hauling out of the area where the logging activities are conducted. This transporting is commonly done by snaking the logs with a cable wound upon a winch or pulling the cable with some form of power means such as a tractor.

Because of uneven terrain and rough surfaces on the limbed logs, they do not skid without axial rotation, but nearly always rotate in one direction or another and sometimes alternately in both directions. These rotational movements have an undesirable effect upon the wire rope. Rotations in the same direction as the convolutions of strands in the rope tend to create extreme radial compression forces within the rope which causes rapid deterioration. Counter rotation tends to spread the convolved strands and admit foreign material among the strands which distort and weaken the rope when individual strands are bent at relatively sharp angles due to reactance forces from the foreign material during a subsequent tensioning of the rope.

Furthermore, the potential energy stored in the twisted rope is a threat capable of seriously injuring a workman when the rope is released and the kinetic energy causes the released end of the rope to thrash around violently during unwinding.

My present invention is a practical device, inexpensive to manufacture, which obviates this potential danger to workmen by eliminating or at least drastically reducing the rope's ability to store energy and therefore also prolongs the useful life of the rope by minimizing the unnecessary deteriorating forces which may be generated in a rope during normal use as hereinbefore described.

In pursuit of these ends, I have designed a heavy-duty swivel hitch clevis which dissipates the said energy and thus obviates the undesirable results thereof.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should also be understood that various changes in construction may be resorted to in the course of manufacture without in any way departing from the spirit of the invention which is to be understood only in accordance with the appended claim. Furthermore, it is to be understood that while the invention is described in one particular association, it is not my intention to unnecessarily limit the applicability of the invention, but I desire to reserve to myself the claimed invention for every use of which it is now known or subsequently discovered to be susceptible.

Other advantages and features of this invention will become apparent from the more detailed description following in which like reference numerals are employed to designate similar parts in the accompanying drawings, wherein:

FIG. 1 is an isometric view of a preferred physical embodiment of my invention;

FIG. 2 is a longitudinal view partially in diametric section; and

FIG. 3 is a modified structure upon a reduced scale.

Referring now more particularly to the drawing, it is clearly seen that the improved swivel hitch has a cylindrical stator 10 to which is affixed, as by welding at 12, a clevis, indicated in its entirety by the numeral 14 (FIGS. 1 and 12) or 14' (FIG. 3).

The clevis 14 has a pair of diametrically opposed arms 16 which are in one plane axially parallel (FIG. 1) and in a plane 90° therefrom (FIG. 2) converge as they extend from the stator and terminate in spaced parallel discs 18 and 18'. The said discs are bored or have openings 20 and 22 which are axially coincident to each other and normal to the axis of the stator 10.

Bore 20 is of sufficient diameter to receive and pass the body 24 of a clevis pin 26 having an enlarged head 28 at one end and threads 30, which mate with the threads of bore 22, on the opposed end. It will thus be seen that the pin 26 is removably secured in the ends of the arms 16.

The species of the invention shown in the drawings has a cylindrical concentric enlarged bore 32 at the end of the stator 10 disposed toward the clevis 14 and thus an annular radial shoulder 34 is defined between the normal inside cylinder wall 36 and the bore 32.

A rotor 38 of cylindrical exterior configuration for the major portion of its length is provided with a radial flange 40. Defined between its cylindrical body 42 and the flange 40 is a radial shoulder 44 which, in annular configuration, is coincident to the shoulder 34 of the stator 10.

Disposed between the shoulders 34 and 44 I prefer to provide a thrust member 46 to effect more freedom of relative rotation of the rotor 38 with respect to the stator 10, but this member 46 may be omitted in situations wherein less freedom of rotation can be tolerated. The thrust member 46 may be selected from any of the now well-known devices of similar function in heavy-duty equipment.

It should be noted also that the shoulder 44 could rotate against the end face 48 of the stator if one desired to omit the enlargement 32. However, to preserve the freedom of rotation, I find it preferable to "counter-sink" the rotor, thus minimizing the entrance of foreign bodies which may tend to bind the rotor 38 to the stator 10 and also prevent pressures from being applied directly to the flange 40 which would be unprotected by the stator 10, were the shoulder 44 resting on the end face 48.

The wire rope 50 may be secured into the rotor 38 in any of the well-known methods for securing wire rope, such as, by leading or using internal or external wedges, designed for the purpose, and designated by the numeral 52 in the drawings to interfit with the conical inside face 53.

In FIG. 3, I have shown a bail-type clevis 14' for use where this form is desirable.

Having thus described my invention, I desire to secure by Letters Patent of the United States the following:

1. A swivel hitch for wire rope, comprising:
an open-ended cylindrical stator having an enlarged annular concentric bore at one end terminating inwardly in an annular shoulder;
a rotor having an exteriorly cylindrical body interfitting within said stator for rotation with respect thereto and an internal conical face tapering from one to the other;
said rotor having at the end coincident to the largest diameter of said conical face, a radial flange defining an inwardly directed shoulder coincident to said first-named shoulder;
a thrust member disposed between said shoulders and encircling said rotor;
clevis arms welded to the outside of said cylindrical stator for substantially its full length at diametrically opposed positions lying in a plane coincident to the axis of said stator and extending beyond the end having the enlarged bore;
said arms being angled inwardly toward each other beyond the last-named end of said stator and terminating in parallel discs spaced from each other a distance less than the outside diameter of said stator;
said discs having axially aligned bores therethrough;
a clevis pin removably secured in said last-named bores; and
wedges cooperably interfitting with said conical face for releasably securing a wire rope.

References Cited

UNITED STATES PATENTS

| | | | |
|---|---|---|---|
| 361,683 | 4/1887 | Eckhart | 287—91 X |
| 637,122 | 11/1899 | Isachson | 24—123 UXR |
| 1,275,018 | 8/1918 | Growder | 287—91 |
| 1,331,892 | 2/1920 | Arbon | 287—91 X |
| 1,613,455 | 1/1927 | Hanson | 24—123.1 UXR |
| 2,311,043 | 2/1943 | Furey | 24—123.1 UXR |
| 2,487,085 | 11/1949 | Wridge | 287—91 |
| 3,344,485 | 10/1967 | Lommen | 24—126 |

FOREIGN PATENTS

| | | |
|---|---|---|
| 471,268 | 2/1951 | Canada. |

BERNARD A. GELAK, Primary Examiner

U.S. Cl. X.R.

24—123, 126; 287—81